Figure 1:
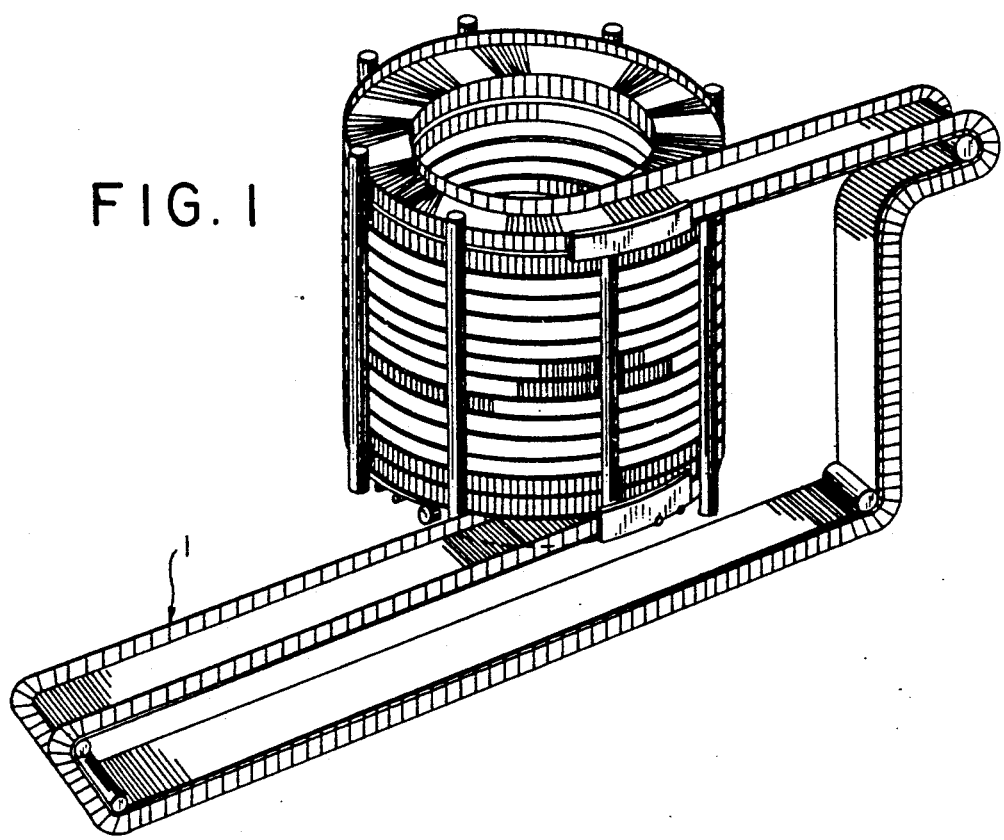

United States Patent [19]
Fröderberg et al.

[11] Patent Number: 5,190,143
[45] Date of Patent: Mar. 2, 1993

[54] CONVEYOR BELT

[75] Inventors: Ingemar Fröderberg, Höganäs; Jaan Rauer, Helsingborg, both of Sweden

[73] Assignee: Frigoscandia Food Process Systems Aktiebolag, Helsingborg, Sweden

[21] Appl. No.: 836,018

[22] PCT Filed: Jun. 26, 1990

[86] PCT No.: PCT/SE90/00455
§ 371 Date: Feb. 26, 1992
§ 102(e) Date: Feb. 26, 1992

[87] PCT Pub. No.: WO91/00233
PCT Pub. Date: Jan. 10, 1991

[30] Foreign Application Priority Data

Jun. 27, 1989 [SE] Sweden ............... 8902310

[51] Int. Cl.$^5$ .............................. B65G 17/06
[52] U.S. Cl. ...................... 198/778; 198/852
[58] Field of Search ........... 198/778, 848, 831, 852; 62/381

[56] References Cited

U.S. PATENT DOCUMENTS

| | | | |
|---|---|---|---|
| 208,198 | 9/1878 | Pickhardt | 198/848 X |
| 2,292,663 | 8/1942 | Scherfel | 198/848 X |
| 2,769,531 | 11/1956 | Guba | 198/848 |
| 3,202,387 | 8/1965 | Andrews et al. | 198/848 X |
| 3,300,030 | 1/1967 | Scherfel | 198/848 |
| 3,542,188 | 11/1970 | Kinney | 198/848 |
| 3,563,366 | 2/1971 | Daringer | 198/848 |
| 4,603,776 | 8/1986 | Olsson | 198/778 |
| 4,867,301 | 9/1989 | Roinestad et al. | 198/778 X |
| 4,941,567 | 7/1990 | Olsson | 198/778 |

FOREIGN PATENT DOCUMENTS 0134272  3/1974  Denmark .
0452590 12/1985  Sweden .

Primary Examiner—Robert P. Olszewski
Assistant Examiner—Cheryl L. Gastineau
Attorney, Agent, or Firm—Browdy and Neimark

[57] ABSTRACT

In an air treatment plant, an endless conveyor belt travels in a helical path over a part of its length. The conveyor belt comprises a bottom consisting of transverse rods and a wire netting, and side plates fixedly connected in pairs with two rods so as to form, together with these rods, a link, which is movable relative to adjoining links about two axes perpendicular to the longitudinal direction of the belt and situated one in the plane of the bottom and the other perpendicular thereto. The wire netting consists of zig-zag wires, each of which encloses not only the two rods of one link but also one adjacent rod of the adjoining link. Furthermore, the ends of each wire are fixed to one of the two rods of the associated link.

20 Claims, 4 Drawing Sheets

CONVEYOR BELT

The present invention relates to an endless conveyor belt for an air treatment plant in which the conveyor belt, over part of its length, travels in a helical path and comprises a bottom consisting of transverse rods and a wire netting, and side plates fixedly connected in pairs with two rods so as to form, together with these rods, a link which is movable relative to adjoining links about two axes perpendicular to the longitudinal direction of the belt and situated one in the plane of the bottom and the other perpendicular thereto.

Conveyor belts of this type are disclosed by e.g. SE, C, 8206760-4 and SE, C, 8506136-4. These conveyor belts are, furthermore, self-stacking, i.e. the side plates also serve as spacers, the upper edge portions of which are adapted to engage the lower edge portions of the overlying turn of the conveyor belt so as to support this turn.

In the known conveyor belts, the wire netting forming part of the bottom consists of zig-zag wires each enclosing two adjacent rods, each of which is enclosed by two such wires.

When the known belt travels around a curve about an axis which is perpendicular to both the longitudinal direction of the belt and the plane of the bottom, the zig-zag wires will be pushed into one another to an extent increasing progressively towards the inner side of the curve. This reduces the guiding effect of the rods on the zig-zag wires so that the zig-zag wires no longer form a completely flat supporting surface for the products carried on the bottom for air treatment, such as cooling, heating or drying.

An inconvenience in the process of manufacturing the known belt, and also when the belt is assembled, is that the zig-zag wires must be differently designed, depending on whether they enclose two rods belonging to the same link, or two rods belonging to different links.

The object of the present invention is, therefore, to provide a conveyor belt of the type mentioned in the introduction to this specification, in which the wire netting consists of but one type of zig-zag wires which, furthermore, form a completely flat supporting surface also when travelling around a curve.

According to the invention, this object is achieved in that the wire netting consists of zig-zag wires, each of which encloses not only the two rods of one link but also one adjacent rod of the adjoining link. Thus, every second rod in the conveyor belt is enclosed by two wires, while the remaining rods are enclosed by but one wire. Furthermore, the extension of the zig-zag wires in the longitudinal direction of the belt substantially corresponds to the relative displacement of two successive wires in the longitudinal direction of the belt.

Also, the ends of each wire may be fixed to one of the two rods of the associated link.

Most preferably, the ends of each wire are fixed to the central one of the three rods enclosed by said wire.

To further guide the wires, each wire may, between its ends and at at least one point, be fixed to one of the two rods of the associated link.

Advantageously, the conveyor belt may have side plates overlapping each other. More precisely, each side plate may have a section which overlaps the corresponding side plate of an adjoining link and has an elongate hole through which passes one rod of the adjoining link.

The invention can be applied to self-stacking as well as to non-self-stacking conveyor belts. In the first case, the side plates of the links may serve as spacers, the upper edge portions of which are adapted to support the links of an overlying turn in the helical part of the conveyor belt path.

Like in the above-mentioned known conveyor belts, the zig-zag wires in the conveyor belt according to the invention only serve to form a product-supporting surface and do not take up the tension in the belt caused by the pulling force applied to the moving belt. Instead, the pulling force is taken up via the side plates at at least one side of the belt.

Figure 2:
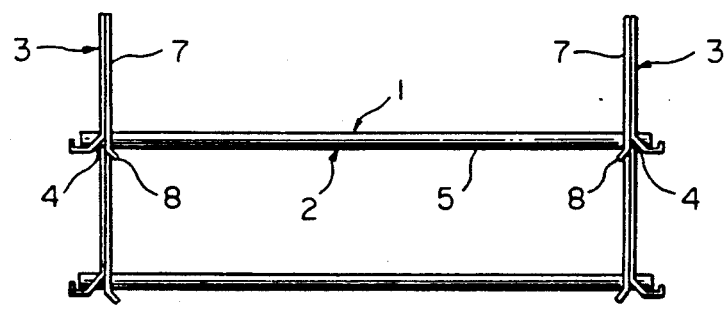
Figure 3:
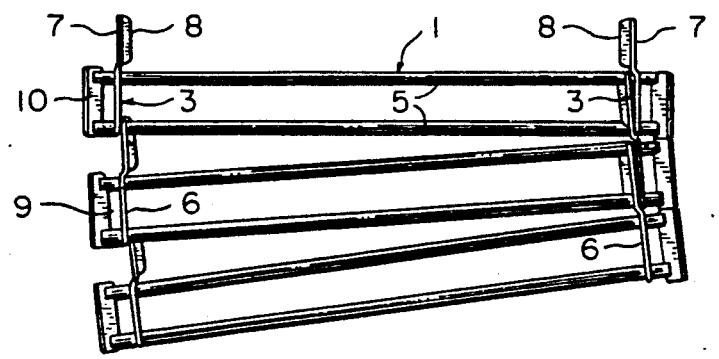
Figure 4:
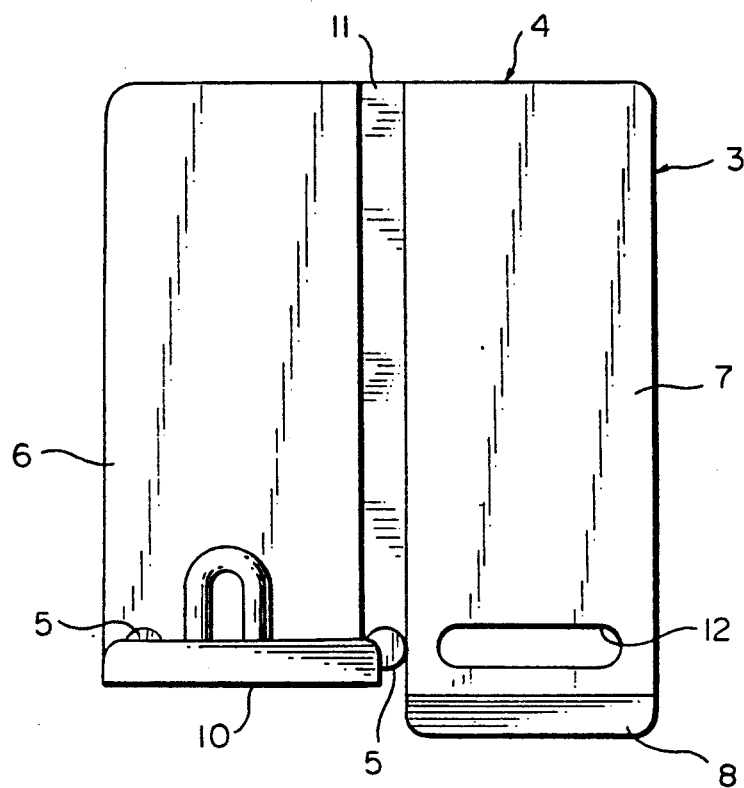
Figure 7:
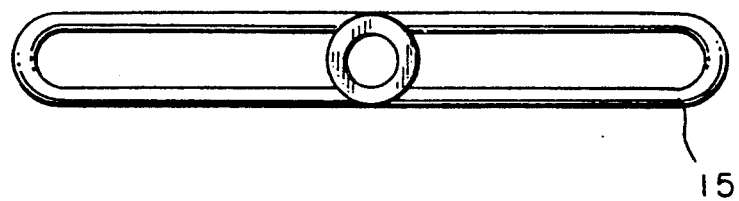
Figure 5:
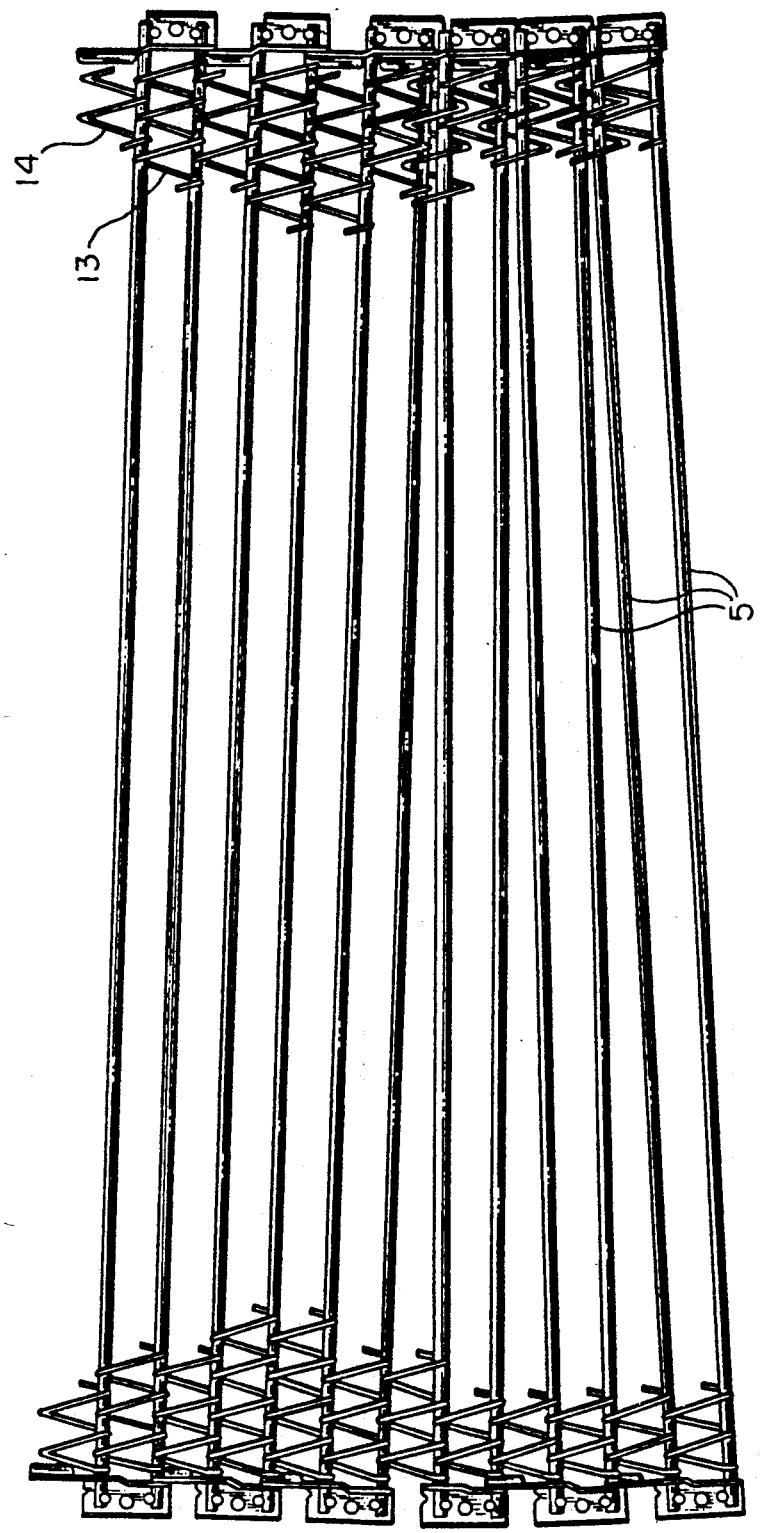
Figure 6:
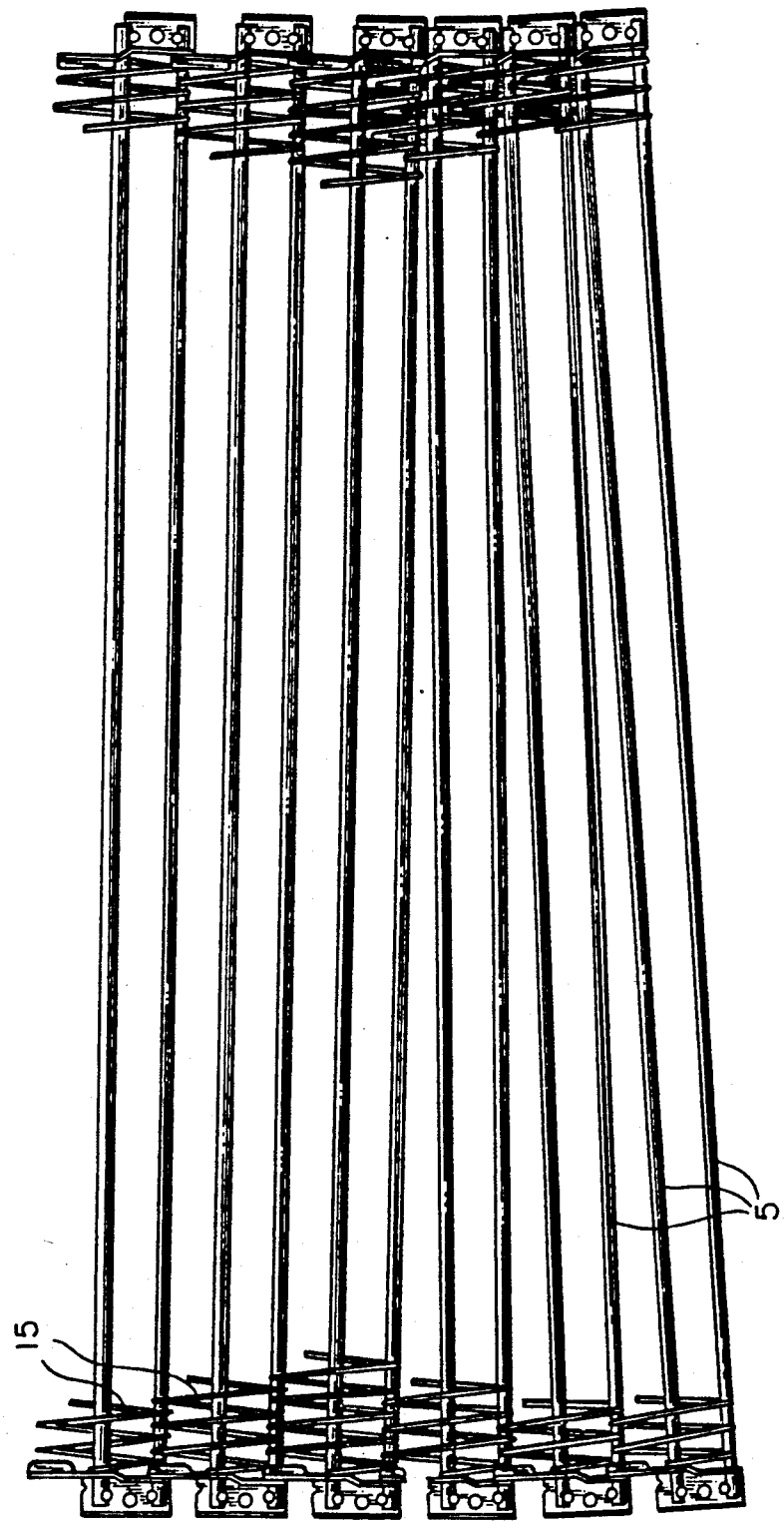

The invention will be described in more detail below, reference being had to the accompanying drawings, in which FIG. 1 is a perspective view of a belt conveyor in an air treatment plant for food, said belt conveyor utilising the conveyor belt according to the present invention, FIG. 2 is a schematic cross-sectional view of two links in two belt turns, FIG. 3 is a top plan view of part of the conveyor belt in FIG. 2, but without the wire netting, FIG. 4 is a side view of one of the side plates in the conveyor belt in FIGS. 2 and 3, FIG. 5 is a top plan view corresponding to FIG. 3 and illustrating the known wire netting, FIG. 6 is a top plan view corresponding to FIG. 3 and illustrating the wire netting according to the invention, and FIG. 7 is an enlarged side view showing a wire forming part of the wire netting in FIG. 6.

An endless conveyor belt 1 adapted for e.g. a conveyor of the type illustrated in FIG. 1, is, as shown in the figures, arranged to travel, over part of its length, in a helical path in a number of superimposed turns. The conveyor belt 1, which is partially shown in FIGS. 2 and 3, comprises a number of hingedly interconnected and relatively adjustable links which consist of a bottom 2 and side plates 3 provided at the sides of the bottom 2 and forming the two sides of the conveyor belt 1. In the embodiment shown, these side plates are also arranged to serve as spacers, the upper edge portions 4 of which engage the lower edge portions of the spacers of the overlying belt turn, to support this turn via its edge portions.

In the embodiment shown, the bottom 2 consists of transverse rods 5 which are fixedly connected in pairs with two side plates 3. The rods 5 are provided with a wire netting to be described later on and serving as a supporting surface for the products to be air-treated and allowing a relative displacement of the links in the longitudinal direction of the belt, as well as relative turning of the links about two axes perpendicular to the longitudinal direction of the belt and located one in the plane of the bottom 2 and the other perpendicular thereto.

Thus, the side plates 3 are, over a part 6 of their length, fixedly connected to the longitudinal edges of the bottom 2. In the embodiment shown, this has been achieved by fixedly connecting the side plates with two of the rods 5 which are spaced apart in the longitudinal direction of the belt 1. The remaining part 7 of the side plates 3, extending in the longitudinal direction of the belt beyond the two rods 5, is movable relative to the bottom 2 and provided with a downwardly and inwardly bent flange 8. The flanges 8 of successive side plates 3 form inner shoulders which engage the inside of the upper edge portion 4 of the side plates 3 of the underlying belt turn. A lower portion 9 of the part 6 is bent downwardly and outwardly, merging with a further outwardly bent portion 10 which extends substantially perpendicular to the side plates 3. Thus, the bent portions 9 of successive side plates 3 form outer shoulders which engage the outside of the upper edge portion 4 of a side plate 3 of the underlying belt turn. In this manner, the upper edge portion 4 is positively guided in the lateral direction between opposing shoulders formed by the flanges 8 and the bent portions 9 alternating therewith in the longitudinal direction of the belt.

As shown in FIG. 4, the part 6 of each side plate 3 is, via a transition area 11, slightly offset laterally relative to the movable part 7, the part 6 overlapping the outer side of the part 7 of the adjacent side plate 3. Furthermore, the part 7 has an elongate hole 12 accommodating the rod 5 of an adjacent side plate 3 and facilitating adjustment of the links relative to one another in the longitudinal direction of the belt, e.g. when the belt is taken around a curve in the plane of the bottom 2.

FIG. 5 shows the conveyor belt in FIG. 3 provided with a prior art wire netting which consists of two wire types 13, 14 which both are wound zig-zag about two adjacent rods 5. One wire type 13 encloses the two rods 5 of one and the same link and is, at its ends, fixedly connected with one or the other of the two rods 5. Thus, this type of wire is fixed relative to one link. The other wire type 14 encloses two rods 5 each belonging to one of two adjoining links. At one end, the wire type 14 is fixedly connected with one rod 5, while it is, at its other end, movable relative to both of the enclosed rods 5. Naturally enough, this reduces the guiding effect which the rods 5 have on the second wire type, and this wire may thus, in the area nearest to the inner side of a curve, become inclined relative to the plane of the bottom 2 so that it does not give the desired flat product-supporting surface.

FIG. 6 shows the conveyor belt in FIG. 3 provided with the wire netting according to the invention. This wire netting consists of identical zig-zag wires 15. As can be seen in FIG. 6, each wire 15 encloses not only the two rods 5 of the associated link, but also an adjacent rod 5 in an adjoining link. The zig-zag wires 15 may also be defined as a flat spiral whose largest width roughly corresponds to twice the distance between the rods 5, and whose smallest width approximately corresponds to the diameter of the rods 5.

At the ends, each wire 15 is fixedly connected with the central rod 5 of the three rods 5 enclosed by said wire. This is achieved in that the ends of the wire 15 are wound a complete turn about the central rod 5, as is shown more clearly in FIG. 7. A possible alternative is to fixedly connect each wire 15 with the other rod 5 in the associated link. Also, each wire 15 may, between its ends and at at least one point, be fixed to one of the two rods 5 of the associated link.

The fixing of the wires 15 to the rods 5 can be further strengthened if the rods 5 are formed with circumferential grooves in which the wire ends are wound. Such grooves, or projecting bosses on the rods, safely prevent the wire ends from slipping on the rods 5.

As can be seen to the right in FIG. 6 where the inner side of a curve is shown, each wire 15 will at all times be guided by the two rods 5 of its own link, when the links are displaced towards one another in the longitudinal direction of the belt. Consequently, the bottom 2 of the conveyor belt 1 has at all times a substantially flat supporting surface for the products carried on the conveyor belt 1, which means that the wire netting according to the invention does not produce any indentations in the supported products, and that the risk of the products getting stuck in the wire netting is eliminated.

Thus, the wire netting according to the invention is advantageous in that it provides the conveyor belt with a flatter supporting surface, that it is less expensive to manufacture since it consists of but one wire type, and that it facilitates assembly of the conveyor belt.

Naturally enough, modifications of the above embodiment of the wire netting according to the invention are conceivable within the scope of the invention. Thus, the invention is not restricted to self-stacking conveyor belts or to the shown embodiment of the side plates 3. Moreover, each wire 15 may be divided into a number of sections each extending over only a portion of the width of the belt 1.

We claim:

1. An endless conveyor belt for an air treatment plant in which the conveyor belt (1), over a part of its length, travels in a helical path and comprises a bottom (2) consisting of transverse rods (5) and a wire netting, and side plates (3) fixedly connected in pairs with two rods (5) so as to form, together with these rods, a link which is movable relative to adjoining links to about two axes perpendicular to the longitudinal direction of the belt and situated one in the plane of the bottom (2) and the other perpendicular thereto, characterised in that the wire netting consists of zig-zag wires (15) each of which encloses not only the two rods (5) of one link but also one adjacent rod (5) of the adjoining link.

2. Conveyor belt as claimed in claim 1, characterised in that the ends of each wire (15) are fixed to one of the two rods (5) of the associated link.

3. Conveyor belt as claimed in claim 2, characterised in that the ends of each wire (15) are fixed to the central one of the three rods (5) enclosed by said wire.

4. Conveyor belt as claimed in claim 2, characterised in that each wire (15) is, between its ends and at at least one point, fixed to one of the two rods (5) of the associated link.

5. Conveyor belt as claimed in claim 1, characterised in that the side plates (3) of each link have a part (7) which overlaps the corresponding side plates (3) of an adjoining link and which has an elongate hole (12) through which passes one rod (5) of the adjoining link.

6. Conveyor belt as claimed in any one of claim 1, characterised in that the side plates (3) of the links serve as spacers, the upper edge portions (4) of which are adapted to support the links of an overlying turn in the helical part of the conveyor belt path.

7. Conveyor belt as claimed in claim 3 wherein each wire (15) is, between its ends and at at least one point, fixed to one of the two rods (5) of the associated link.

8. Conveyor belt as claimed in claim 2 wherein the side plates (3) of each link have a part (7) which overlaps the corresponding side plates (3) of an adjoining link and which has an elongate hole (12) through which passes one rod (5) of the adjoining link.

9. Conveyor belt as claimed in claim 3 wherein the side plates (3) of each link have a part (7) which overlaps the corresponding side plates (3) of an adjoining link and which has an elongate hole (12) through which passes one rod (5) of the adjoining link.

10. Conveyor belt as claimed in claim 4 wherein the side plates (3) of each link have a part (7) which overlaps the corresponding side plates (3) of an adjoining link and which has an elongate hole (12) through which passes one rod (5) of the adjoining link.

11. Conveyor belt as claimed in claim 7 wherein the side plates (3) of each link have a part (7) which overlaps the corresponding side plates (3) of an adjoining link and which has an elongate hole (12) through which passes one rod (5) of the adjoining link.

12. Conveyor belt as claimed in claim 2 wherein the side plates (3) of the links serve as spacers, the upper edge portions (4) of which are adapted to support the links of an overlying turn in the helical part of the conveyor belt path.

13. Conveyor belt as claimed in claim 3 wherein the side plates (3) of the links serve as spacers, the upper edge portions (4) of which are adapted to support the links of an overlying turn in the helical part of the conveyor belt path.

14. Conveyor belt as claimed in claim 4 wherein the side plates (3) of the links serve as spacers, the upper edge portions (4) of which are adapted to support the links of an overlying turn in the helical part of the conveyor belt path.

15. Conveyor belt as claimed in claim 5 wherein the side plates (3) of the links serve as spacers, the upper edge portions (4) of which are adapted to support the links of an overlying turn in the helical part of the conveyor belt path.

16. Conveyor belt as claimed in claim 7 wherein the side plates (3) of the links serve as spacers, the upper edge portions (4) of which are adapted to support the links of an overlying turn in the helical part of the conveyor belt path.

17. Conveyor belt as claimed in claim 8 wherein the side plates (3) of the links serve as spacers, the upper edge portions (4) of which are adapted to support the links of an overlying turn in the helical part of the conveyor belt path.

18. Conveyor belt as claimed in claim 9 wherein the side plates (3) of the links serve as spacers, the upper edge portions (4) of which are adapted to support the links of an overlying turn in the helical part of the conveyor belt path.

19. Conveyor belt as claimed in claim 10 wherein the side plates (3) of the links serve as spacers, the upper edge portions (4) of which are adapted to support the links of an overlying turn in the helical part of the conveyor belt path.

20. Conveyor belt as claimed in claim 11 wherein the side plates (3) of the links serve as spacers, the upper edge portions (4) of which are adapted to support the links of an overlying turn in the helical part of the conveyor belt path.

* * * * *